United States Patent
Ohshita

[11] Patent Number: 6,028,383
[45] Date of Patent: Feb. 22, 2000

[54] RESOLVER STATOR STRUCTURE HAVING INSULATION EXTENDED PORTION WITH CONNECTOR PINS

[75] Inventor: Hiromi Ohshita, Nagano-ken, Japan

[73] Assignee: Tamagawa Seiki Kabushiki Kaisha, Nagano-ken, Japan

[21] Appl. No.: 09/066,599

[22] Filed: Apr. 27, 1998

[30] Foreign Application Priority Data

May 1, 1997 [JP] Japan .................................. 9-114038

[51] Int. Cl.[7] .............................. H02K 5/04; H01F 15/10
[52] U.S. Cl. .............................. 310/71; 310/43; 310/254; 310/260
[58] Field of Search .............................. 310/71, 194, 254, 310/67 R, 260, 43; 439/45, 135, 136, 146, 147

[56] References Cited

U.S. PATENT DOCUMENTS

| | | |
|---|---|---|
| 4,720,646 | 1/1988 | Torimoto .................................. 310/71 |
| 4,841,190 | 6/1989 | Matsushita et al. ..................... 310/257 |
| 5,057,732 | 10/1991 | Fukaya .................................... 310/208 |
| 5,264,816 | 11/1993 | Degenhart et al. ..................... 336/192 |
| 5,298,820 | 3/1994 | Lee et al. ........................... 310/40 MM |
| 5,389,846 | 2/1995 | Okazaki et al. .................. 310/40 MM |

*Primary Examiner*—Thomas M. Dougherty
*Assistant Examiner*—Tran Nguyen
*Attorney, Agent, or Firm*—Sughrue, Mion, Zinn, Macpeak & Seas, PLLC

[57] ABSTRACT

In a stator structure of a resolver, an extended insulating portion (10) formed integrally with an insulation member (4) is provided with pins (11), stator windings (5) are connected to the pins (11) and a lead wire (7) or a connector (6) is connected to the pins (11). The above arrangement permits the automatic assembly, cost reduction and improvement of productivity of the stator structure as well as the prevention of deterioration of the output characteristics of the resolver which has been conventionally occurred.

2 Claims, 5 Drawing Sheets

RESOLVER STATOR STRUCTURE HAVING INSULATION EXTENDED PORTION WITH CONNECTOR PINS

BACKGROUND OF THE INVENTION

1. Field of the Invention

The present invention relates to a stator structure of a resolver, and more specifically, to a novel improvement in a stator structure of a resolver for permitting it to be automatically assembled by connecting pins to which stator windings are connected to pins composed of an insulation member and disposed to an iron core.

2. Description of the Related Art

In general, the structure shown in FIG. 1 is conventionally employed as this type of prior art stator structures of a resolver. That is, what is denoted by numeral 1 in FIG. 1 is a multi-layered iron core and a multiplicity of tooth portions 2 and slots 3 are alternately formed inwardly of the iron core 1 in a circumferential direction. Stator windings 5 are wound around the respective tooth portions 2 through an insulation member 4 which is formed to a ring-shape and has projections corresponding to the respective tooth portions 2 and the stator windings 5 are electrically insulated from the respective tooth portions 2 of the stator windings 5. The end wires of the stator windings 5 are connected by solder or the like to a lead wire 7 which is connected to a connector 6.

Since the prior art stator structures of a resolver are arranged as described above, they have the following problems.

That is, since the lead wire having the connector must be manually connected to the end wires of the stator windings, it is difficult to improve productivity. In addition, since the lead wire is overlapped with the stator windings, it adversely affect the output characteristics of the resolver. Further, since soldering must be manually performed, it is impossible to automatically assemble the resolver.

An object of the present invention made to solve the above problems is to provide a stator structure of a resolver which permits the stator structure to be automatically assembled by connecting pins to which stator windings are connected to pins composed of an insulation member and disposed to an iron core.

SUMMARY OF THE INVENTION

According to the present invention, in a stator structure of a resolver arranged such that stator windings are wound around a multiplicity of tooth portions formed to an iron core through an insulation and connected to the outside through a lead wire having a connector, the stator structure comprises an extended insulating portion formed integrally with the insulation member and having pins, wherein the stator windings are connected to the pins as well as the lead wire is connected to the extended portions of the pins.

Further, in a stator structure of a resolver arranged such that stator windings are wound around a multiplicity of tooth portions formed to an iron core through an insulation member and connected to the outside through a connector, the stator structure comprises an extended insulating portion formed integrally with the insulation member and having pins; a receiving portion formed to an end of the extended insulating portion; and connector pins located to the receiving portion and formed integrally with the pins, wherein an external connector is detachably mounted to the receiving portion.

DESCRIPTION OF THE PREFERRED EMBODIMENTS

Preferable embodiments of a stator structure of a resolver according to the present invention will be described with reference to the drawings. In the following description, parts similar or equivalent to those of prior art are described using the same numerals as those used in prior art.

Figure 1:
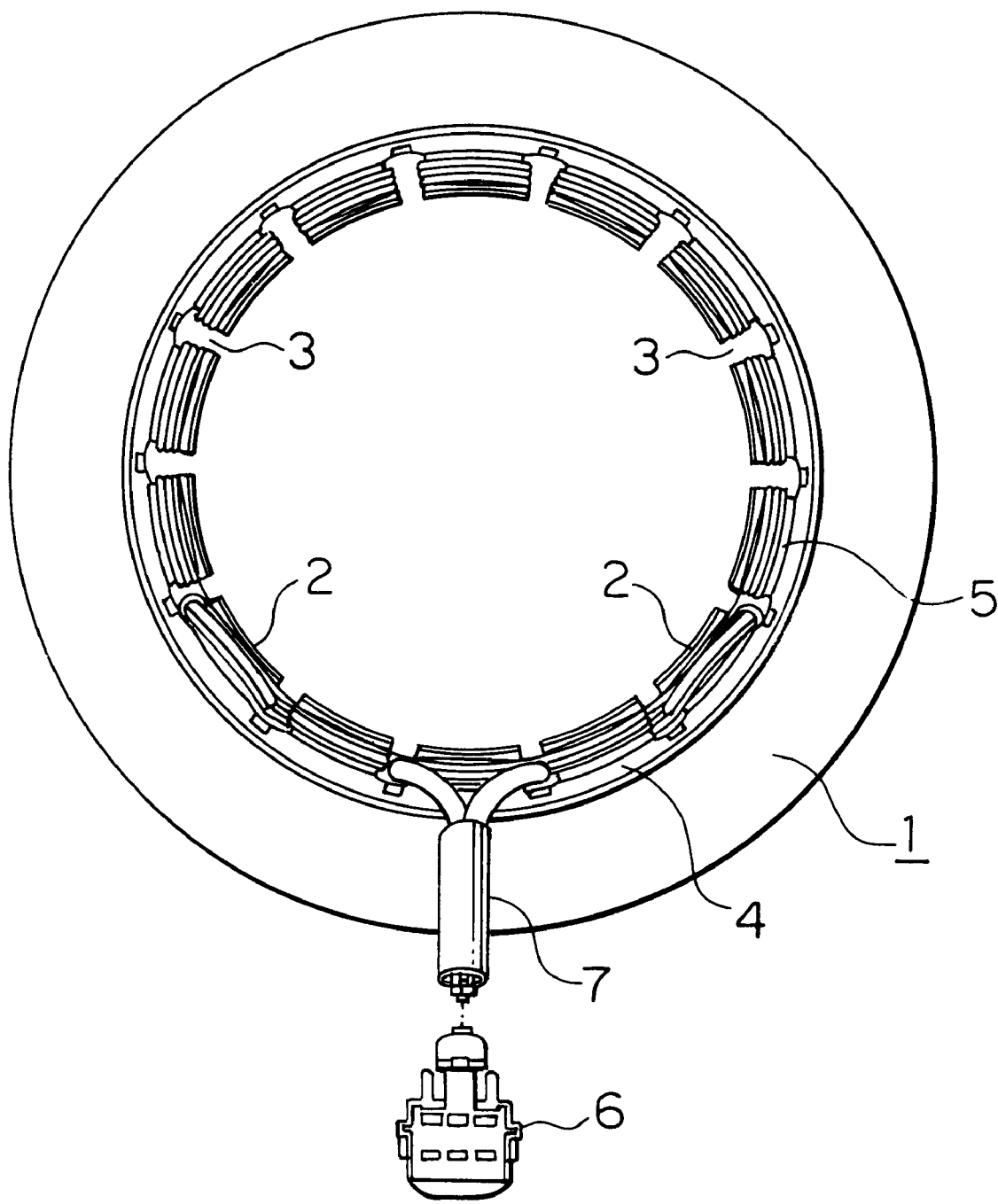
FIG. 1 is a view showing an arrangement of a prior art stator structure of a resolver.
Figure 2:
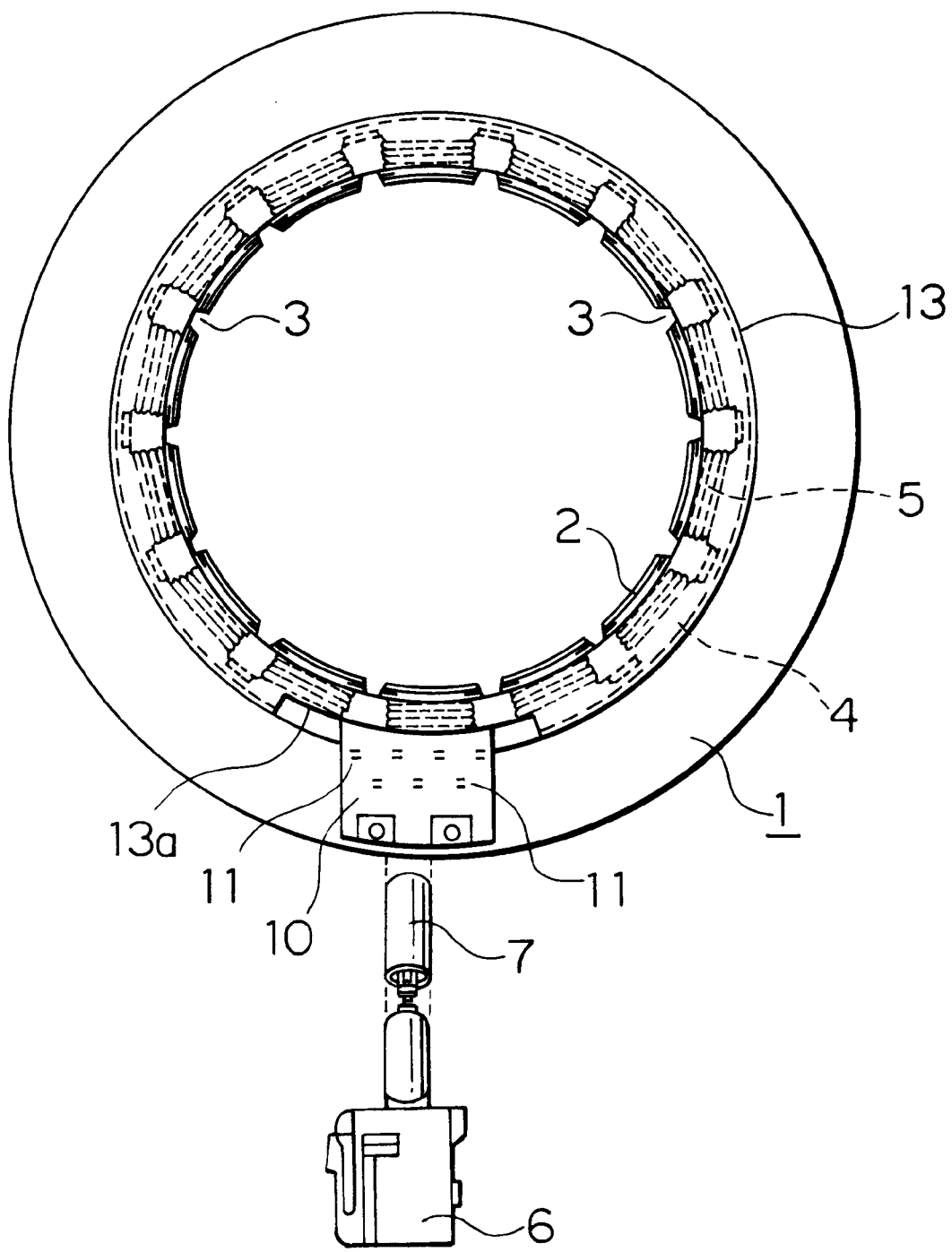
FIG. 2 is a view showing a stator structure of a resolver according to the present invention.

In FIG. 2, what is denoted by numeral 1 is a multilayered iron core, and a multiplicity of tooth portions 2 and slots 3 are alternately formed inwardly of the iron core 1 in a circumferential direction. Stator windings 5 are wound around the respective tooth portions 2 through a well-known insulation member 4 which is formed to a ring-shape as a whole, has projections corresponding to the respective tooth portions 2 and is called an insulation cap by those skilled in the art and the stator windings 5 are electrically insulated from the respective tooth portions 2 of the iron core 1.

An extended insulating portion 10 which extends along the end surface of the iron core 1 is formed to an end of the insulation member 4 integrally therewith and a plurality of pins 11 are implanted to the extended insulating portion 10.

A lead wire 7 having a connector 6 is previously connected to the extended portions 11a of the respective pins 11, the end wires (not shown) of the stator windings 5 are connected to the respective pins 11 (the job for connecting them is performed by a not shown automatic machine), a cover 12 is detachably disposed on the extended insulating portion 10 so as to cover the pins 11 as well as a winding cover 13 which is formed to a ring-shape as a whole and has a cutout 13a in correspondence to the extended insulating portion 10 is disposed on the stator windings 5. Therefore, the stator structure of the resolver arranged as shown in FIG. 2 can be automatically assembled by successively executing by an automatic machine the processes of attaching the insulation member 4 having the extended insulating portion 10 to the iron core 1, winding the stator windings 5 around the respective tooth portions 2, connecting the end sires of the stator windings 5 to the respective pins 11 and mounting the winding cover 13.

Figure 3:
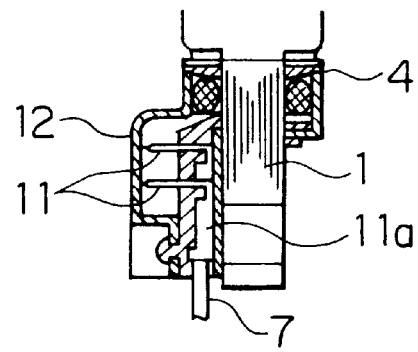
FIG. 3 is a sectional view of the main portion of FIG. 2.
Figure 4:
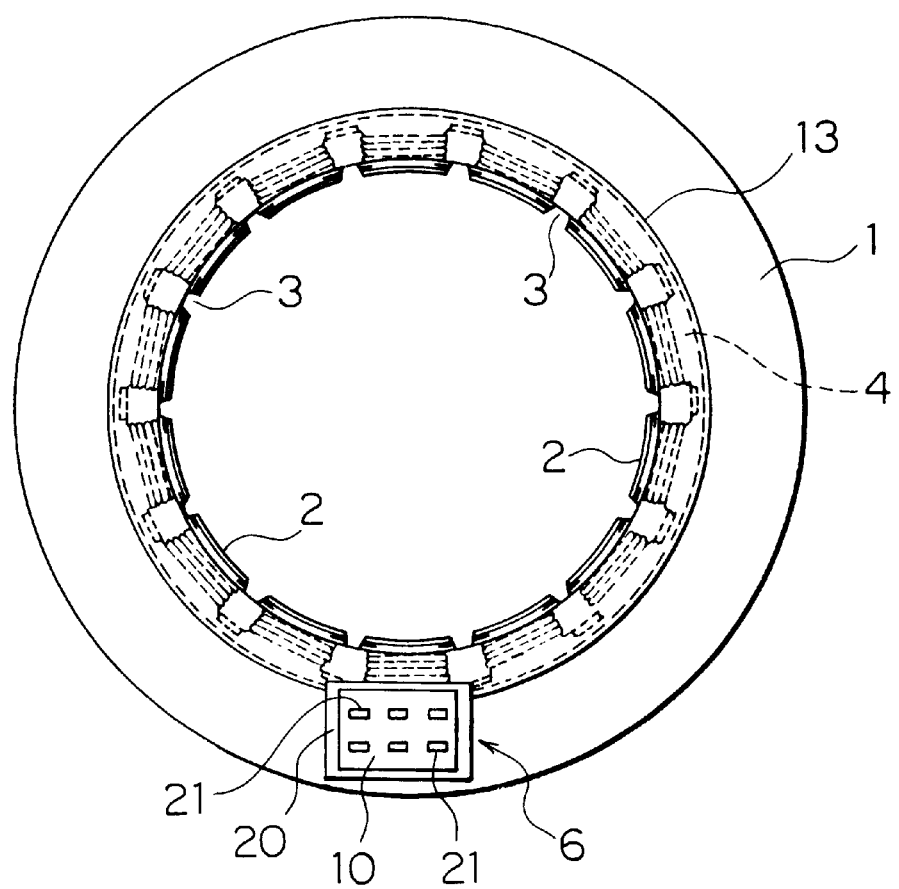
FIG. 4 is a view showing another embodiment of FIG. 2.
Figure 5:
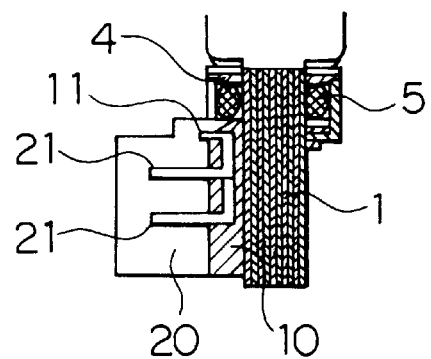
FIG. 5 is a sectional view of the main portion of FIG. 4.
Figure 6:
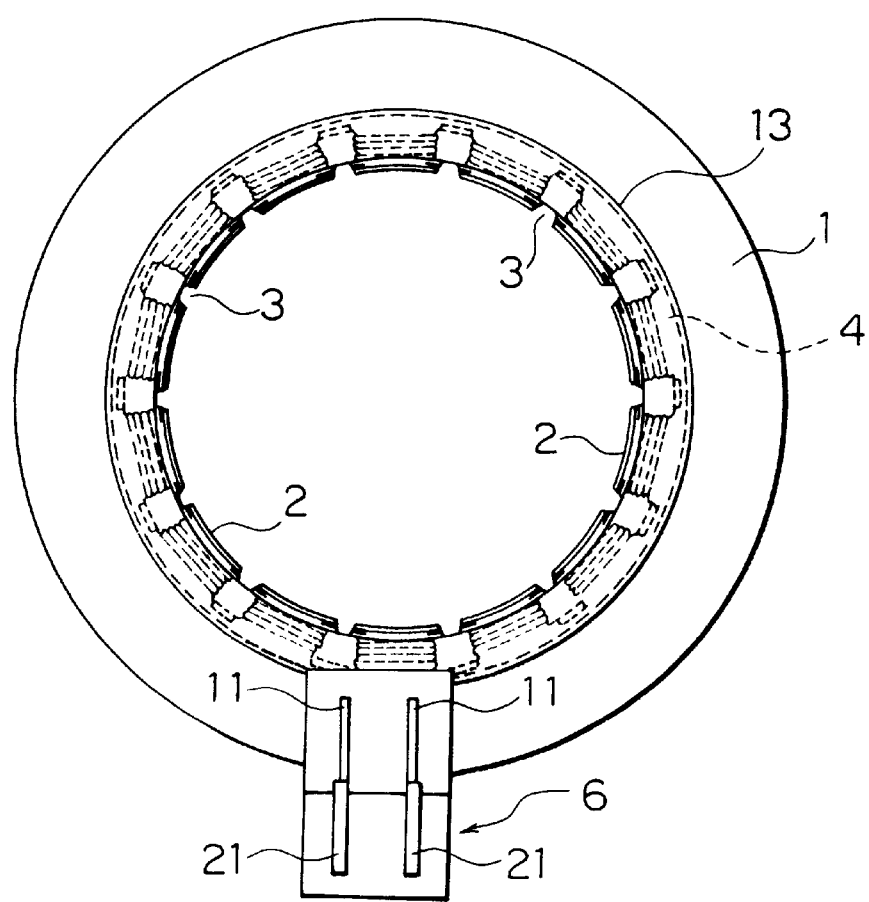
FIG. 6 is a view showing the structure of still another embodiment of FIG. 2.
Figure 7:
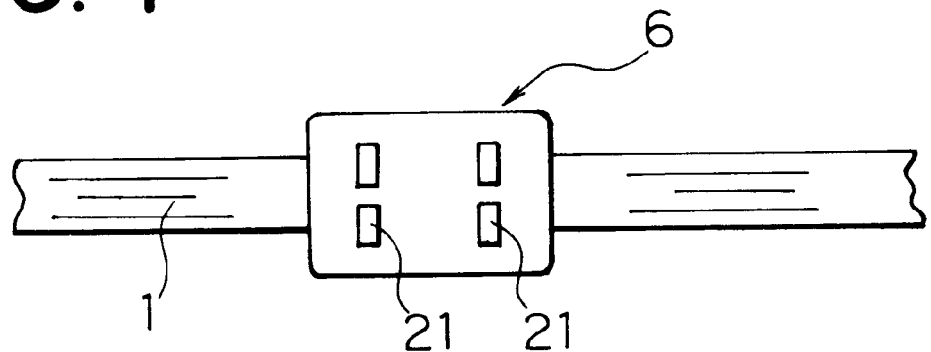
FIG. 7 is a front elevational view of the main portion of FIG. 6.
Figure 8:
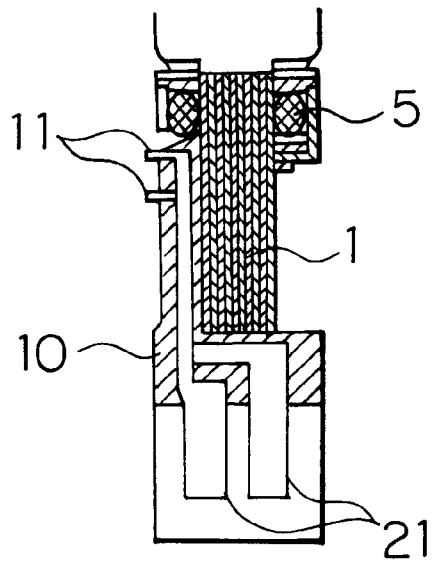
FIG. 8 is a sectional view of the main portion of FIG. 6.
Figure 9:
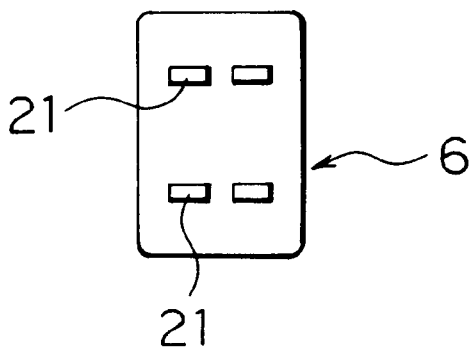
FIG. 9 is a front elevational view FIG. 8.

Another embodiment of the present invention will be described with reference to FIG. 4 and FIG. 5, wherein parts similar to those shown in FIG. 2 and FIG. 3 are denoted by the same numerals and the description thereof is omitted and only the portions of the embodiment different from those of FIG. 2 and FIG. 3 will be described.

An open receiving portion 20 is formed to the extended insulating portion 10 and connector pins 21 are formed to the respective pins 11 integrally therewith which are implanted to the extended insulating portion 10. The connector 6 is composed of the receiving portion 20 and the respective connector pins 21 located in the receiving portion 20 and a not shown external connector is detachably mounted to the connector 6.

Still another embodiment of the present invention will be described with reference to FIG. 6 to FIG. 9. Although parts similar or equivalent to those shown in FIG. 4 and FIG. 5 are denoted by the same numerals and the description thereof is omitted, the connector pins 21 which constitute the connector 6 extends in the same direction as that of the surface direction of the iron core 1. The shapes of the extended insulating portion 10, the pins 11 and the connector pins 21 are not limited to those mentioned above and any other shapes which are not shown in the drawings may be employed.

Since the stator structure of the resolver according to the present invention is arranged as described above, the following advantages can be achieved.

That is, since the pins are implanted to the extended insulating portion which is interposed between the iron core and the windings and formed integrally with the insulting member and the windings are connected to the pins, the stator structure can be automatically assembled, the cost of the stator structure can be reduced and productivity can be improved as well as the deterioration of the output characteristics which has been conventionally caused by the connection of the lead wire can be prevented.

What is claimed is:

1. A stator structure of a resolver, arranged such that stator windings are wound around a multiplicity of tooth portions formed to an iron core through an insulation member and said stator windings are connected to the outside through a connector, the stator structure comprising:

an extended insulating portion formed integrally with the insulation member and having winding connection pins;

a receiving portion formed on an end of the extended insulating portion;

connector pins implanted into said receiving portion and formed integrally with the winding connection pins; and a winding cover, formed in a ring shape, mounted over at least a portion of said stator windings and having a cutout in correspondence to the extended insulating portion, wherein said receiving portion is capable of receiving an external connection.

2. A stator structure of a resolver, arranged such that stator windings are wound around a multiplicity of tooth portions formed to an iron core through an insulation member and said stator windings are connected to the outside through a lead wire connected to a connector, the stator structure comprising:

an extended insulating portion, formed integrally with the insulation member, having pins, and a winding cover, formed in a ring shape, mounted over at least a portion of said stator windings and having a cutout in correspondence to the extended insulating portion, wherein the stator windings are connected to the pins and the lead wire is connected to extended portions of the pins.

* * * * *